United States Patent
Hwang et al.

(10) Patent No.: US 12,555,870 B2
(45) Date of Patent: *Feb. 17, 2026

(54) BATTERY CASE FOR SECONDARY BATTERY AND METHOD FOR MANUFACTURING GAS DISCHARGE PART

(71) Applicant: LG Energy Solution, Ltd., Seoul (KR)

(72) Inventors: Soo Ji Hwang, Daejeon (KR); Sang Hun Kim, Daejeon (KR); Yong Su Choi, Daejeon (KR); Hyung Kyun Yu, Daejeon (KR); Na Yoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 748 days.

This patent is subject to a terminal disclaimer.

(21) Appl. No.: 17/630,272

(22) PCT Filed: Aug. 24, 2020

(86) PCT No.: PCT/KR2020/011270

§ 371 (c)(1),
(2) Date: Jan. 26, 2022

(87) PCT Pub. No.: WO2021/040357

PCT Pub. Date: Mar. 4, 2021

(65) Prior Publication Data

US 2022/0336922 A1 Oct. 20, 2022

(30) Foreign Application Priority Data

Aug. 27, 2019 (KR) .................. 10-2019-0105417

(51) Int. Cl.
*H01M 50/105* (2021.01)
*H01M 50/184* (2021.01)
(Continued)

(52) U.S. Cl.
CPC ....... *H01M 50/394* (2021.01); *H01M 50/105* (2021.01); *H01M 50/184* (2021.01);
(Continued)

(58) Field of Classification Search
CPC ..................... H01M 50/394; H01M 50/188
See application file for complete search history.

(56) References Cited

U.S. PATENT DOCUMENTS 5,362,577 A 11/1994 Pedicini
6,811,716 B1 11/2004 Stengaard et al.
(Continued)

FOREIGN PATENT DOCUMENTS

CN 1234822 A 11/1999
CN 1653629 A 8/2005
(Continued)

OTHER PUBLICATIONS

Machine translation of KR 20150034498 A from PE2E (Year: 2015).*

(Continued)

*Primary Examiner* — Nicholas A Smith
*Assistant Examiner* — Zackary Richard Cochenour
(74) *Attorney, Agent, or Firm* — Lerner David LLP

(57) ABSTRACT

A battery case for a secondary battery according to an embodiment of the present invention for achieving the object can include a cup part provided with an accommodation space configured to accommodate an electrode assembly formed by stacking an electrode and a separator; a sealing part extending outward from the cup part; and a gas discharge part which is attached from the inside to a hole formed by perforating at least one of the cup part or the sealing part and through which a gas passes. The gas discharge part can include a gas discharge layer through which the gas passes; and an outer functional layer which is (Continued)

formed on an outer surface of the gas discharge layer and has hydrophobicity.

10 Claims, 5 Drawing Sheets

(51) Int. Cl.
    *H01M 50/188*     (2021.01)
    *H01M 50/30*     (2021.01)
    *H01M 50/325*     (2021.01)

(52) U.S. Cl.
    CPC ....... *H01M 50/188* (2021.01); *H01M 50/325* (2021.01); *H01M 2200/20* (2013.01)

(56) References Cited

U.S. PATENT DOCUMENTS

| | | | |
|---|---|---|---|
| 12,080,912 | B2* | 9/2024 | Hwang ............... H01M 50/105 |
| 2006/0051658 | A1 | 3/2006 | Otohata et al. |
| 2010/0266881 | A1 | 10/2010 | You et al. |
| 2011/0143176 | A1 | 6/2011 | Otohata et al. |
| 2012/0176730 | A1 | 7/2012 | Takemura et al. |
| 2013/0316247 | A1* | 11/2013 | Kuma .................. C08J 5/18 |
| | | | 361/502 |
| 2015/0037692 | A1* | 2/2015 | Park .................. H01M 50/1385 |
| | | | 429/405 |
| 2016/0118669 | A1 | 4/2016 | Ito et al. |
| 2017/0133648 | A1 | 5/2017 | Fukuoka et al. |
| 2017/0274416 | A1 | 9/2017 | Yeom |
| 2018/0241023 | A1 | 8/2018 | Lim et al. |
| 2019/0267593 | A1 | 8/2019 | Do et al. |
| 2020/0235360 | A1 | 7/2020 | Im et al. |
| 2022/0255186 | A1 | 8/2022 | Hwang et al. |
| 2022/0263166 | A1 | 8/2022 | Hwang et al. |

FOREIGN PATENT DOCUMENTS

| | | | |
|---|---|---|---|
| CN | 106714947 A | | 5/2017 |
| CN | 107107096 A | | 8/2017 |
| CN | 107949932 A | | 4/2018 |
| CN | 109845014 A | | 6/2019 |
| EP | 0934375 B1 | | 6/2000 |
| EP | 3156120 A1 | | 4/2017 |
| EP | 3312904 A1 | | 4/2018 |
| EP | 3989306 A1 | | 4/2022 |
| EP | 4002568 A1 | | 5/2022 |
| EP | 4009432 A1 | | 6/2022 |
| JP | S52054826 U | | 4/1977 |
| JP | 65714367 U | | 1/1982 |
| JP | 2000256915 A | | 9/2000 |
| JP | 2001-504555 A | † | 4/2001 |
| JP | 2002141041 A | | 5/2002 |
| JP | 2004043995 A | | 2/2004 |
| JP | 2007-214451 A | † | 8/2007 |
| JP | 2008-198664 A | † | 2/2008 |
| JP | 2011108433 A | | 6/2011 |
| JP | 2011-233747 A | † | 11/2011 |
| JP | 2012156489 A | | 8/2012 |
| JP | 2014209526 A | | 11/2014 |
| JP | 2016157538 A | | 9/2016 |
| JP | 2016163875 A | | 9/2016 |
| JP | 2017-206777 A | † | 11/2017 |
| JP | 2017220656 A | | 12/2017 |
| JP | 2018-006182 A | | 1/2018 |
| JP | 2018-521481 A | † | 8/2018 |
| KR | 100968050 B1 | | 7/2010 |
| KR | 20120076914 A | | 7/2012 |
| KR | 101472202 B1 | | 12/2014 |
| KR | 20150034498 A | | 4/2015 |
| KR | 20150135878 A | | 12/2015 |
| KR | 20170011358 A | | 2/2017 |
| KR | 20170018029 A | | 2/2017 |
| KR | 20170049014 A | | 5/2017 |
| KR | 20170057297 A | | 5/2017 |
| KR | 20190042215 A | | 4/2019 |
| WO | 2014185491 A1 | | 11/2014 |
| WO | 2015/194470 A1 | † | 4/2017 |
| WO | 2018110067 A1 | | 6/2018 |

OTHER PUBLICATIONS

Machine translation of KR 20130099892 A from Espacenet (Year: 2013).*
Machine translation of JP 2017206777 A from espacenet (Year: 2017).*
Notification of the Third Party Observation of European Application No. 20857350.1. 15 pgs.
Extended European Search Report including Written Opinion for Application No. 20857350.1 dated Sep. 23, 2022, pp. 1-12.
International Search Report for Application No. PCT/KR2020/011270 mailed Dec. 9, 2020, 3 pages.
Search Report dated Aug. 30, 23 from the Office Action for Chinese Application No. 202080053430.3 issued Aug. 31, 23, pp. 1-3. [See pp. 1-2, categorizing the cited references].
Kakuta, M, et al., "Surface structure of discharge-treated Teflon", May 15, 1969, 6 pages. [Providing English Translation of Abstract only].
Iwamori, S. et al., "Polytetrafluoroethylene (PTEE)-Ethylene Vinyl Alcohol (EVOH) Thin Films Prepared by Co-evaporation", J. Vac. Soc. Jpn., Dec. 3, 2005, 6 pages. [Providing English Translation of Abstract only].

\* cited by examiner
† cited by third party

BATTERY CASE FOR SECONDARY BATTERY AND METHOD FOR MANUFACTURING GAS DISCHARGE PART

CROSS-REFERENCE TO RELATED APPLICATION

The present application is a national phase entry under 35 U.S.C. § 371 of International Application No. PCT/KR2020/011270 filed on Aug. 24, 2020, which claims the benefit of the priority of Korean Patent Application No. 10-2019-0105417, filed on Aug. 27, 2019, all of which are hereby incorporated by reference in their entirety.

TECHNICAL FIELD

The present invention relates to a battery case for a secondary battery and a method for manufacturing a gas discharge part, and more specifically, to a battery case for a secondary battery, in which pressure may be controlled by discharging to the outside a gas present inside a pouch when internal pressure therein increases, and a method for manufacturing a gas discharge part.

BACKGROUND ART

In general, as types of secondary batteries, there are nickel-cadmium batteries, nickel-hydrogen batteries, lithium-ion batteries, lithium-ion polymer batteries, and the like. Such a secondary battery is being applied and used in large products requiring a high output such as electric vehicles or hybrid electric vehicles, and power storage devices and backup-power storage devices for storing surplus generated power and new renewable energy, as well as small products such as digital cameras, P-DVDs, MP3 players, cellular phones, PDAs, portable game devices, power tools, and E-bikes.

The secondary battery is classified into a pouch type, a can type, or the like according to a material of a case that accommodates an electrode assembly. In the pouch type, the electrode assembly is accommodated in a pouch made of a flexible polymer material. Also, in the can type, the electrode assembly is accommodated in a pouch made of a metal or plastic material, or the like.

Here, a gas may be generated in the secondary battery by an internal short circuit due to external impact, overcharging, over-discharging, or the like. In addition, when the secondary battery is kept or stored at a high temperature, an electrochemical reaction between an electrolyte and an electrode active material may be quickly accelerated by the high temperature to thereby generate a gas.

Here, the generated gas increases the internal pressure of the secondary battery and thereby causes problems such as weakening of a bonding force between components, damage of a case of the secondary battery, an early operation of a protection circuit, deformation of an electrode, an internal short circuit, explosion, and the like. To prevent these problems, protection members such as a CID filter and a safety vent are provided in the can-type secondary battery. Thus, when the pressure within the case increases, electrical connection is physically interrupted. However, the protection members are not sufficiently provided in the pouch-type secondary battery according to the related art.

DISCLOSURE OF THE INVENTION

Technical Problem

The object of the invention is to provide a battery case for a secondary battery, in which pressure may be controlled by discharging to the outside a gas present inside a pouch when internal pressure therein increases, and a method for manufacturing a gas discharge part.

The object of the present invention is not limited to the aforesaid, but other objects not described herein will be clearly understood by those skilled in the art from descriptions below.

Technical Solution

A battery case for a secondary battery according to an embodiment of the present invention for achieving the object includes: a cup part provided with an accommodation space configured to accommodate an electrode assembly formed by stacking an electrode and a separator; a sealing part extending outward from the cup part; and a gas discharge part which is attached from the inside to a hole formed by perforating at least one of the cup part or the sealing part and through which a gas passes, wherein the gas discharge part includes: a gas discharge layer through which the gas passes; and an outer functional layer which is formed on an outer surface of the gas discharge layer and has hydrophobicity.

Also, the outer functional layer may include a plurality of fine protrusions distributed on an outer surface thereof.

Also, each of the fine protrusions may have a diameter of 50 nm to 10 μm.

Also, each of the fine protrusions may have a diameter of 100 nm to 1 μm.

Also, the outer functional layer may include oil or a wax component.

Also, the oil may include at least one of fluorocarbon oil, silicone oil, carbon-based oil, or fatty acid amide.

Also, the gas discharge layer may include at least one of polypropylene (PP), polyethylene (PE), polytetrafluoroethylene (PTFE), or polyvinylidene fluoride (PVDF).

Also, an inner functional layer may be further provided which is formed on an inner surface of the gas discharge layer and has hydrophobicity.

Also, the sealing part may include: an inner area adjacent to the cup part; and an outer area which is positioned outward from the inner area to serve as an edge and sealed to seal the cup part, wherein the hole is formed in the inner area of the sealing part.

Also, the gas discharge part may be provided in plurality.

A method for manufacturing a gas discharge part according to an embodiment of the present invention for achieving the object includes: preparing a gas discharge layer through which a gas passes; manufacturing a mixture by mixing fine particles and a polymer solution; spraying the mixture onto at least one surface of the gas discharge layer; and drying the mixture.

Also, the gas discharge layer may include at least one of polypropylene (PP), polyethylene (PE), polytetrafluoroethylene (PTFE), or polyvinylidene fluoride (PVDF).

Also, the polymer solution may include at least one of polypropylene (PP), polyethylene (PE), polytetrafluoroethylene (PTFE), or polyvinylidene fluoride (PVDF).

Also, the fine particles may include at least one of silica particles, carbon nanotubes (CNT), or alumina particles.

Also, the silica particles may be contained at 0.1 wt % to 2 wt %.

Also, in the spraying of the mixture, the mixture may be sprayed at a distance of 8 cm to 15 cm from the gas discharge layer at pressure of 0.2 Mpa to 0.5 Mpa through a nozzle.

Also, the spraying of the mixture and the drying of the mixture may be repeated two to four times.

A pouch-type secondary battery according to an embodiment of the present invention for achieving the object includes: an electrode assembly formed by stacking an electrode and a separator; and a battery case configured to accommodate therein the electrode assembly, wherein the battery case includes: a cup part provided with an accommodation space configured to accommodate the electrode assembly; a sealing part extending outward from the cup part; and a gas discharge part which is attached from the inside to a hole formed by perforating at least one of the cup part or the sealing part and through which a gas passes, wherein the gas discharge part includes: a gas discharge layer through which the gas passes; and an outer functional layer which is formed on an outer surface of the gas discharge layer and has hydrophobicity.

A method for manufacturing a pouch-type secondary battery according to an embodiment of the present invention for achieving the object includes: forming a cup part by drawing a pouch film; forming a hole by perforating at least one of the cup part or a sealing part that extends outward from the cup part; attaching, from the inside to the hole, a gas discharge part through which a gas passes; accommodating, in an accommodation space provided in the cup part, an electrode assembly formed by stacking an electrode and a separator; and heat-pressing the sealing part.

Also, the gas discharge part may include: a gas discharge layer through which the gas passes; and an outer functional layer which is formed on an outer surface of the gas discharge layer and has hydrophobicity, wherein the pouch film includes a sealant layer which is made of a polymer and positioned as an innermost layer, and in the attaching of the gas discharge part, the outer functional layer is heated and pressed and is sealed to the sealant layer.

Other specific features of the present invention are included in the detailed description and drawings.

Advantageous Effects

According to the embodiments of the present invention, at least the following effects are obtained.

The hole is made in the battery case, and the gas discharge part through which the gas is discharged is attached to the hole. Thus, when the internal pressure of the secondary battery increases, the pressure may be controlled by discharging the gas from the inside to the outside.

Also, the outer functional layer or the inner functional layer are formed in the gas discharge part. Thus, the moisture may be prevented from entering from the outside, and the electrolyte may be prevented from leaking from the inside.

Also, the gas discharge part is attached to the hole from the inside. Thus, the metal of the gas barrier layer exposed to the inner circumferential surface of the hole may be prevented from being corroded by the electrolyte.

The effects according to the present invention are not limited to those exemplified above, and more various effects are included in the present specification.

MODE FOR CARRYING OUT THE INVENTION

Figure 1:
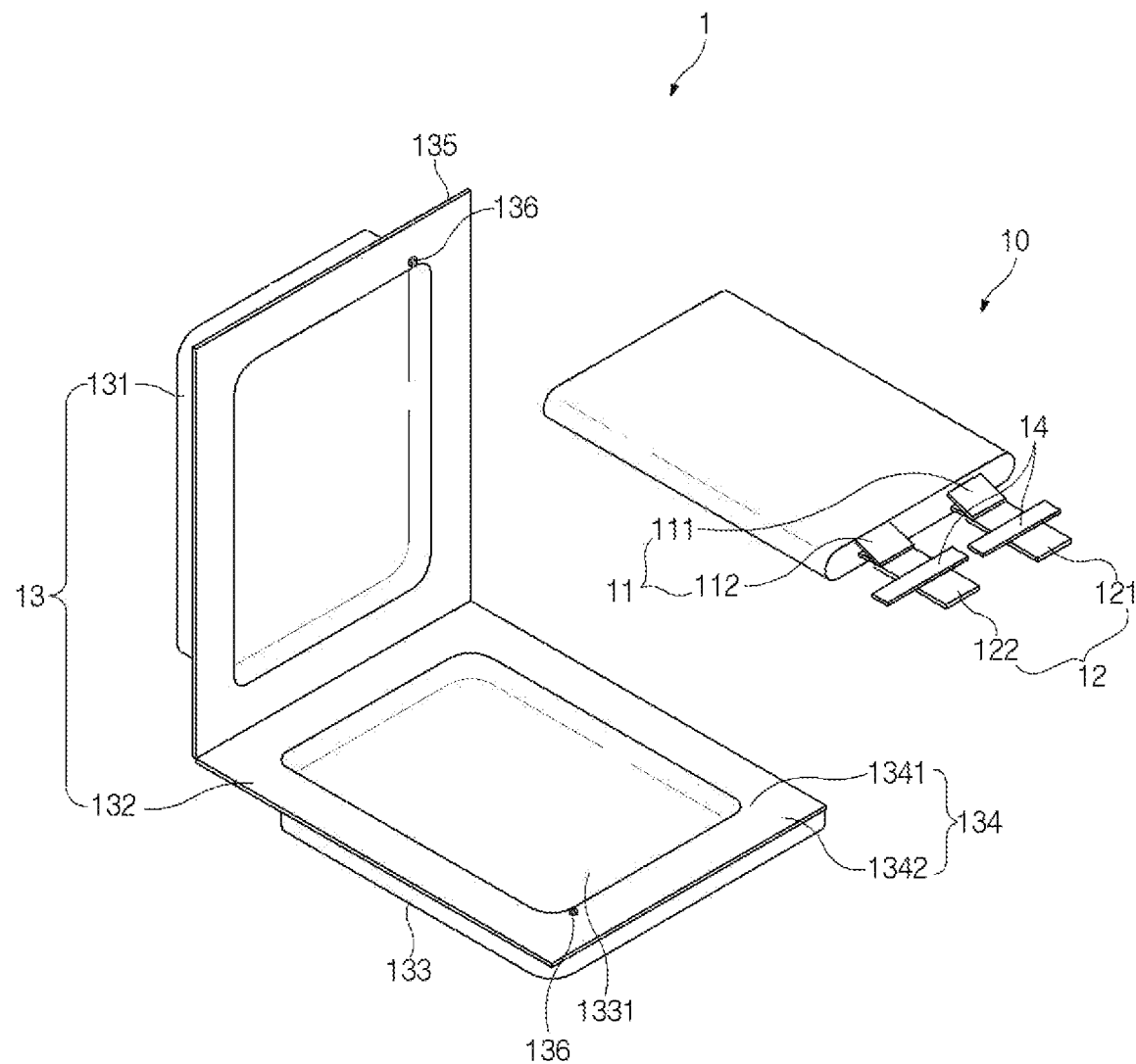
FIG. 1 is an assembly view of a pouch-type secondary battery according to an embodiment of the present invention.

Advantages and features of the present invention, and implementation methods thereof will be clarified through following embodiments described in detail with reference to the accompanying drawings. The present invention may, however, be embodied in various different forms and should not be construed as limited to the embodiments set forth herein. Rather, these embodiments are provided so that this disclosure will be thorough and complete, and will fully convey the scope of the present invention to those skilled in the art. Further, the present invention is defined only by scopes of claims. Like reference numerals refer to like elements throughout.

Unless otherwise defined, all terms (including technical and scientific terms) used herein may have the same meaning as commonly understood by one of ordinary skill in the art to which the present invention belongs. Terms as defined in a generally used dictionary are not construed ideally or excessively unless defined apparently and specifically.

In this specification, the terms are used only for explaining embodiments while not limiting the present invention. In this specification, the singular forms include the plural forms as well, unless the context clearly indicates otherwise. The meaning of "comprises" and/or "comprising" used in the specification does not exclude the presence or addition of other components besides a mentioned component.

Hereinafter, preferred embodiments of the present invention will be described in detail with reference to the accompanying drawings.

Figure 2:
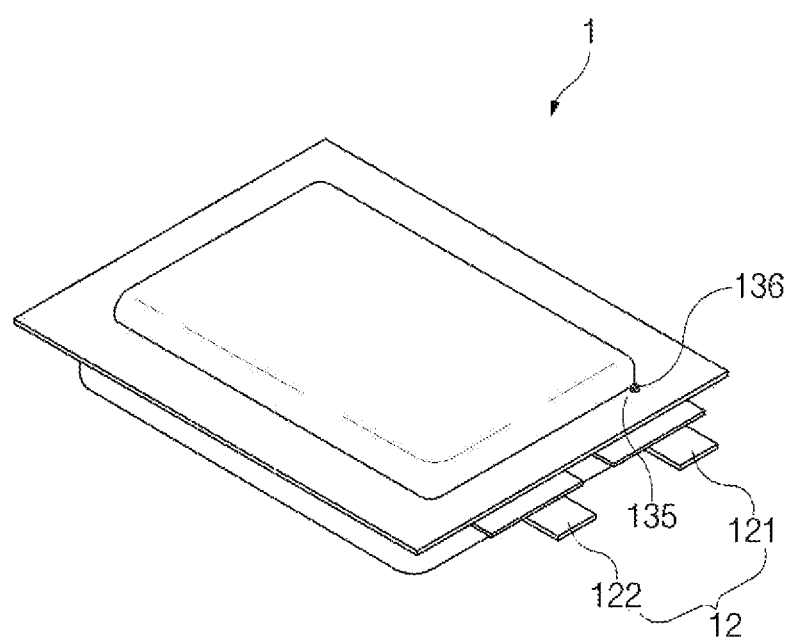
FIG. 2 is a perspective view of the pouch-type secondary battery of FIG. 1.

FIG. 1 is an assembly view of a pouch-type secondary battery 1 according to an embodiment of the present invention, and FIG. 2 is a perspective view of pouch-type secondary battery 1.

As illustrated in FIG. 1, the pouch-type secondary battery 1 according to the embodiment of the present invention includes an electrode assembly 10 which is formed by stacking a separator and electrodes such as a positive electrode and a negative electrode and a pouch-type battery case 13 which accommodates therein the electrode assembly 10.

To manufacture the pouch-type secondary battery 1, slurry, in which an electrode active material, a binder, and a plasticizer are mixed, is applied first to a positive electrode collector and a negative electrode collector to manufacture electrodes such as a positive electrode and a negative electrode. Then, the electrodes are stacked on both sides of a separator to form the electrode assembly 10 having a predetermined shape. Subsequently, the electrode assembly 10 is inserted into the battery case 13, an electrolyte is injected therein, and then the battery case 13 is sealed.

Particularly, the electrode assembly 10 may be a stack structure provided with two types of electrodes such as the positive electrode and the negative electrode and the separator interposed between the electrodes or disposed on the left or right side of one of the electrodes to insulate the electrodes from each other. The stack structure may not be limited to that described above but have various configuration. The positive electrode and the negative electrode having predetermined specifications may be stacked with the separator therebetween, or the stack structure may be wound in a jelly roll shape. The two types of electrodes, that is, the positive electrode and the negative electrode have structures in which active material slurry is applied to the electrode collectors having metal foil or metal mesh shapes including aluminum and copper, respectively. The slurry may be generally formed by mixing granular active materials, subsidiary conductors, binders, plasticizers, and the like in a state where a solvent is added. The solvent is removed during a subsequent process.

The electrode assembly 10 include an electrode tab 11 as illustrated in FIG. 1. The electrode tab 11 is connected to each of the positive electrode and the negative electrode of the electrode assembly 10, and protrudes outward from the electrode assembly 10 to serve as a path through which electrons may move between the inside and the outside of the electrode assembly 10. The collector of the electrode assembly 10 is provided as a portion which is coated with the electrode active material and an end portion, that is, a non-coating portion which is not coated with the electrode active material. Also, the electrode tab 11 may be formed by cutting the non-coating portion or formed by connecting a separate conductive member to the non-coating portion through ultrasonic welding or the like. Although the electrode tab 11 may protrude from one side of the electrode assembly 10 side by side in the same direction as illustrated in FIG. 1, the embodiment is not limited thereto. The electrode tab may protrude in different directions.

An electrode lead 12 is connected to the electrode tab 11 of the electrode assembly 10 through spot welding or the like. Also, a portion of the electrode lead 12 is surrounded by an insulation part 14. The insulation part 14 is positioned to be limited to a sealing part 134, in which an upper case 131 and a lower case 132 of the battery case 13 are heat-fused, and is bonded to the battery case 13. Also, electricity generated from the electrode assembly 10 is prevented from flowing to the battery case 13 through the electrode lead 12, and the sealing of the battery case 13 is maintained. Thus, the insulation part 14 is made of a non-conductor having non-conductivity in which the electricity does not flow well. Generally, although relatively thin insulation tape easily attached to the electrode lead 12 is widely used as the insulation part 14, the embodiment is not limited thereto. Various members capable of insulating the electrode lead 12 may be used.

The electrode lead 12 includes a positive electrode lead 121 which has one end connected to a positive electrode tab 111 and extends in a direction in which the positive electrode tab 111 protrudes and a negative electrode lead 122 which has one end connected to a negative electrode tab 112 and extends in a direction in which the negative electrode tab 112 protrudes. Here, the other ends of both the positive electrode lead 121 and the negative electrode lead 122 protrude outward from the battery case 13 as illustrated in FIG. 1. Accordingly, the electricity generated inside the electrode assembly 10 may be supplied to the outside. Also, since the positive electrode tab 111 and the negative electrode tab 112 may protrude in various directions, the positive electrode lead 121 and the negative electrode lead 122 may extend in various directions, respectively.

The positive electrode lead 121 and the negative electrode lead 122 may have materials different from each other. That is, the positive electrode lead 121 may have the same aluminum (Al) material as the positive electrode collector, and the negative electrode lead 122 may have the same copper (Cu) material or nickel (Ni)-coated copper material as the negative electrode collector. Also, a portion of the electrode lead 12 protruding outwards from the battery case 13 serves as a terminal part and is electrically connected to an external terminal.

The battery case 13 is a pouch made of a flexible material. Also, the battery case 13 is sealed after accommodating the electrode assembly 10 such that a portion of the electrode lead 12, i.e., the terminal part is exposed. The battery case 13 includes the upper case 131 and the lower case 132 as illustrated in FIG. 1. The lower case 132 includes a cup part 133 to provide an accommodation space 1331 in which the electrode assembly 10 may be accommodated, and the upper pouch 131 covers the accommodation space 1331 from above so that the electrode assembly 10 is not separated to the outside of the battery case 13. Here, as illustrated in FIG. 1, the upper case 131 also include the cup part 133 in which the accommodation space 1331 is provided, and thus, the electrode assembly 10 may be accommodated from above. However, the embodiment is not limited thereto and may be configured in various shapes. The cup part 133 may be formed only in the lower case 132. Also, although the upper case 131 and the lower case 132 may be manufactured such that one sides thereof are connected to each other as illustrated in FIG. 1, the embodiment is not limited thereto. The cases may be diversely manufactured, for example, individually manufactured and separated from each other.

The battery case 13 includes a gas discharge part 136 through which a gas passes. The gas discharge part 136 is attached from the inside to a hole 137 formed by perforating at least one of the cup part 133 or the sealing part 134 and through which a gas passes.

The hole 137 is formed in at least one of the upper case 131 or the lower case 132. That is, only one hole 137 may be formed, but the plurality of holes may be possible. Also, as illustrated in FIG. 1, the sealing part 134 extending outward from the cup part 133 includes an inner area 1341 adjacent to the cup part 133 and an outer area 1342 which is positioned outward from the inner area 1341 to serve as an edge and sealed to seal the cup part 133. Here, it is desirable that the hole 137 is formed in the inner area 1341 rather than in the outer area 1342 in the sealing part 134. Also, when the sealing part 134 is sealed subsequently, it is desirable not to seal the inner area 1341 in which the hole 137 is positioned but to seal only the outer area 1342. Accordingly, two sealing parts 134 of the upper and lower cases 131 and 132 come into contact with each other to close the hole 137 in a normal state. Thus, the moisture may be prevented from entering from the outside, and the electrolyte may be prevented from leaking from the inside. Also, when a large amount of gases is generated inside the secondary battery 1, the volume of the secondary battery 1 expands, and the inner areas 1341 of the two sealing parts 134 in contact with each other are spaced apart from each other. As a result, the hole 137 is open, and the gas may be discharged to the outside through the gas discharge part 136. However, the embodiment is not limited thereto, and the hole 137 may be formed at various positions, for example, formed in one surface of the cup part 133 as long as it may easily discharge the gas.

It is desirable that a gas may easily pass through the gas discharge part 136, but a liquid such as water or an electrolyte does not easily pass therethrough. The gas discharge part 136 will be described later in detail.

When the electrode lead 12 is connected to the electrode tab 11 of the electrode assembly 10, and the insulation part 14 is provided on the portion of the electrode lead 12, the electrode assembly 10 is accommodated in the accommodation space 1331 provided in the cup part 133 of the lower case 132, and the upper case 131 covers the space from above. Then, the electrolyte is injected to the inside, and the sealing parts 134 provided on the edges of the upper case 131 and the lower case 132 are sealed. The electrolyte is to move lithium ions generated by an electrochemical reaction of the electrode during charging and discharging of the secondary battery 1. Also, the electrolyte may include a non-aqueous organic electrolyte, which is a mixture of a lithium salt and a high-purity organic solvent, or may include a polymer using a polymer electrolyte. Through the method described above, the pouch-type secondary battery 1 may be manufactured as illustrated in FIG. 2.

Figure 3:
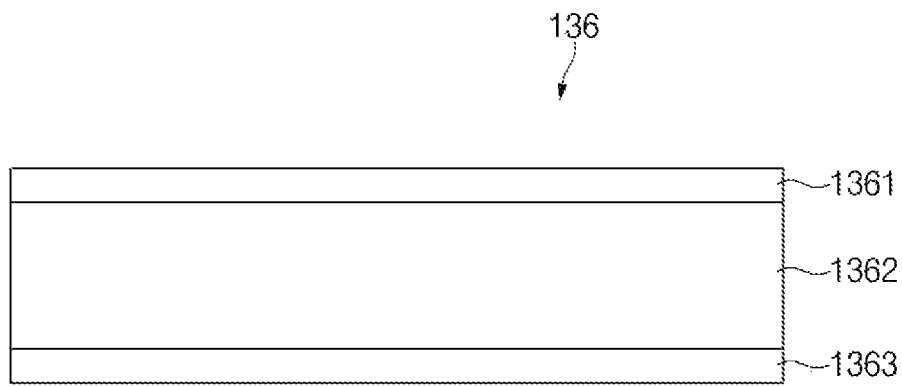
FIG. 3 is a cross-sectional view of a gas discharge part according to an embodiment of the present invention.

FIG. 3 is a cross-sectional view of the gas discharge part 136 according to an embodiment of the present invention.

The gas discharge part 136 is attached from the inside to the hole 137 formed by perforating at least one of the cup part 133 or the sealing part 134, and the gas passes therethrough. As illustrated in FIG. 3, the gas discharge part 136 includes a gas discharge layer 1362 through which the gas passes and an outer functional layer 1361 which is formed on an outer surface of the gas discharge layer 1362 and has hydrophobicity. Also, an inner functional layer 1363 may be further provided which is formed on an inner surface of the gas discharge layer 1362 and has hydrophobicity.

It is desirable that the gas discharge layer 1362 is made of a semipermeable membrane so that a gas may easily pass therethrough while a liquid such as water or an electrolyte does not easily pass therethrough. The gas discharge layer 1362 may include at least one of polypropylene (PP), polyethylene (PE), polytetrafluoroethylene (PTFE), or polyvinylidene fluoride (PVDF). Also, a biaxially stretching method may be used to manufacture the gas discharge layer 1362. That is, a raw material including the materials described above is used and extruded into a film shape, and then the extruded material may be stretched in both a mechanical direction and a transverse direction to manufacture the gas discharge layer 1362. However, the embodiment is not limited thereto, and a phase separation method may be used. That is, the raw material including the materials described above is deposited, as a form of film, onto a plate, and then a solvent is evaporated by changing a temperature. Subsequently, the plate may be immersed in a tank filled with the separate solution to manufacture the gas discharge layer 1362.

According to an embodiment of the present invention, there is no separate cover for opening and closing the hole 137 formed in the battery case 13. If a cover is present, it is not easy for the cover to open the hole 137 and then close the hole 137 again. Also, to solve the limitation described above, when a separate hinge is installed so that the cover opens and closes the hole 137, a structure thereof may become complicated, and the durability may be deteriorated. However, if the cover is not present, even though it is not easy for the liquid to pass through the gas discharge layer 1362, a small amount of moisture may enter from the outside through the gas discharge layer 1362.

Thus, as illustrated in FIG. 3, the outer functional layer 1361 having the hydrophobicity is formed on the outer surface of the gas discharge layer 1362. Here, the outer surface of the gas discharge layer 1362 may represent a surface in the outside of the secondary battery 1 when the secondary battery 1 is manufactured, that is, a surface which is formed in a direction opposite to the electrode assembly 10.

According to the embodiment of the present invention, the outer functional layer 1361 may include a plurality of fine protrusions distributed on an outer surface thereof. Thus, the plurality of fine protrusions may prevent the moisture from being condensed on the outer surface of the outer functional layer 1361 and thus exhibit the hydrophobicity. Here, the outer surface of the outer functional layer 1361 represents a surface on the opposite side from the surface bonded to the gas discharge layer 1362. A diameter of each of the fine protrusion may be 50 nm to 10 μm, and preferably, 100 nm to 1 μm. If the diameter of the fine protrusion is excessively small, the hydrophobicity may be lowered. On the other hand, if the diameter is excessively large, a fusion force between the gas discharge part 136 and a pouch film 135 may be lowered over time.

The outer functional layer 1361 include fine particles so that the fine protrusions are distributed, and the fine particles may include at least one of silica particles, carbon nanotubes (CNT), or alumina particles. In particular, is most desirable to include carbon nanotubes (CNT). However, the outer functional layer 1361 has to exhibit the hydrophobicity, but the silica particles have hydrophilicity. Thus, when the fine particles include the silica particles, it is desirable to include an extremely small amount such as about 0.1 wt % to about 2 wt %.

Here, according to another embodiment of the present invention, the outer functional layer 1361 may include oil or a wax component. Since the oil or the wax component has oleophilicity not to be mixed with moisture, it may exhibit the hydrophobicity. Here, the oil may include at least one of fluorocarbon oil, silicone oil, carbon-based oil, or fatty acid amide. The wax may include at least one of paraffin wax or carbon-based wax.

If the cover is not present in the hole 137, not only a small amount of moisture enters, but also a small amount of electrolyte may leak from the inside through the gas discharge layer 1362. Thus, as illustrated in FIG. 3, the inner functional layer 1363 having the hydrophobicity may be formed on the inner surface of the gas discharge layer 1362. Here, the inner surface of the gas discharge layer 1362 may represent a surface in the inside of the secondary battery 1 when the secondary battery 1 is manufactured, that is, a surface which is formed in a direction toward the electrode assembly 10.

According to the embodiment of the present invention, the inner functional layer 1363 may also include a plurality of fine protrusions distributed on an outer surface thereof. To this end, the inner functional layer 1363 also include the fine particles, and the fine particles may include at least one of silica particles, carbon nanotubes (CNT), or alumina particles. Here, the outer surface of the inner functional layer 1363 represents a surface on the opposite side from the surface bonded to the gas discharge layer 1362.

Here, according to another embodiment of the present invention, the inner functional layer 1363 may include oil or a wax component. Here, the oil may include at least one of fluorocarbon oil, silicone oil, carbon-based oil, or fatty acid amide.

As described above, as the outer functional layer 1361 and the inner functional layer 1363 are provided, the moisture may be further effectively prevented from entering from the outside, and the electrolyte may be further effectively prevented from leaking from the inside.

Figure 4:
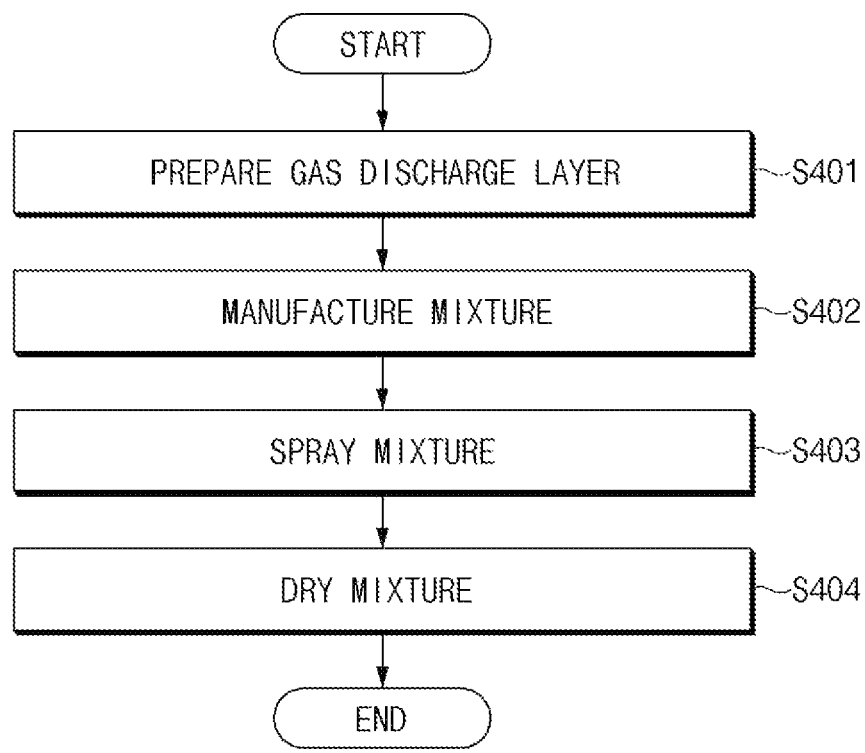
FIG. 4 is a flowchart showing a method for manufacturing a gas discharge part according to an embodiment of the present invention.

FIG. 4 is a flowchart showing a method for manufacturing a gas discharge part 136 according to an embodiment of the present invention.

The method for manufacturing the gas discharge part 136 according to an embodiment of the present invention includes: preparing the gas discharge layer 1362 through which a gas passes; manufacturing a mixture by mixing fine particles and a polymer solution; spraying the mixture onto at least one surface of the gas discharge layer 1362; and drying the mixture.

In particular, the gas discharge layer 1362 through which the gas passes is prepared first (S401). As described above, it is desirable that the gas discharge layer 1362 is made of the semipermeable membrane so that a gas may easily pass therethrough while a liquid such as water or an electrolyte does not easily pass therethrough. The gas discharge layer 1362 may include at least one of polypropylene (PP), polyethylene (PE), polytetrafluoroethylene (PTFE), or polyvinylidene fluoride (PVDF).

Then, the fine particles and the polymer solution are mixed to manufacture the mixture (S402). Here, the fine particles may include at least one of silica particles, carbon nanotubes (CNT), or alumina particles. However, the outer functional layer 1361 has to exhibit the hydrophobicity, but the silica particles have hydrophilicity. Thus, when including the silica particles, it is desirable to include an extremely small amount such as about 0.1 wt % to about 2 wt %. Also, a diameter of each of the fine particles may be 50 nm to 10 µm, and preferably, 100 nm to 1 µm. If the diameter of the fine particle is excessively small, the hydrophobicity may be lowered. On the other hand, if the diameter is excessively large, a fusion force between the gas discharge part 136 and the pouch film 135 may be lowered over time.

The polymer solution may include at least one of polypropylene (PP), polyethylene (PE), polytetrafluoroethylene (PTFE), or polyvinylidene fluoride (PVDF). That is, since the polymer solution may have the same or similar material as the gas discharge layer 1362, the outer functional layer 1361 or the inner functional layer 1363 may be easily stacked on the gas discharge layer 1362.

Then, the mixture is sprayed onto the at least one surface of the gas discharge layer 1362 (S403). When sprayed onto the outer surface of the gas discharge layer 1362, the outer functional layer 1361 is formed, and when sprayed onto the inner surface of the gas discharge layer 1362, the inner functional layer 1363 is formed.

When the mixture is sprayed, a spray coating method may be used. For example, the mixture is sprayed at a distance of about 8 cm to about 15 cm, and particularly, 10 cm from the gas discharge layer 1362 at pressure of 0.2 Mpa to 0.5 Mpa, and particularly, 0.4 Mpa through a nozzle. However, the embodiment is not limited thereto, and various coating methods may be used.

Subsequently, heat is applied to dry the mixture (S404). Here, when the temperature of heat to be applied is excessively low, an excessively long period of time may be consumed to dry the mixture, and when the temperature is excessively high, a shape of the gas discharge layer 1362 may be deformed. Thus, it is desirable to apply heat at a temperature of 50° C. to 140° C., and particularly, 50° C. to 100° C.

Accordingly, the outer functional layer 1361 or the inner functional layer 1363 may be formed. Also, the step (S403) and the step (S404) may be repeated two to four times.

Figure 5:
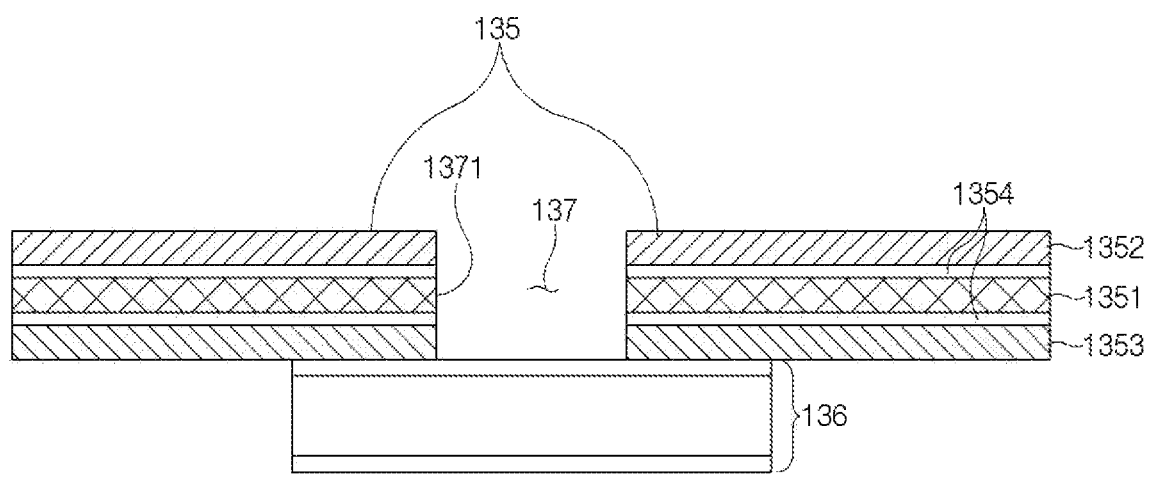
FIG. 5 is a cross-sectional view of a pouch film according to an embodiment of the present invention.

FIG. 5 is a cross-sectional view of a pouch film 135 according to an embodiment of the present invention.

According to an embodiment of the present invention, the hole 137 is made in the battery case 13, and the gas discharge part 136 through which a gas passes is attached to the hole 137. Thus, when the internal pressure of the secondary battery 1 increases, the pressure may be controlled by discharging the gas from the inside to the outside. Also, the outer functional layer 1361 or the inner functional layer 1363 are formed in the gas discharge part 136. Thus, the moisture may be prevented from entering from the outside, and the electrolyte may be prevented from leaking from the inside. Also, the gas discharge part 136 is attached to the hole 137 from the inside. Thus, a metal of a gas barrier layer 1351 exposed to an inner circumferential surface 1371 of the hole 137 may be prevented from being corroded by the electrolyte.

To this end, according to an embodiment of the present invention, the battery case 13 for the secondary battery 1 includes: the cup part 133 provided with the accommodation space 1331 for accommodating the electrode assembly 10 formed by stacking an electrode and a separator; the sealing part 134 extending outward from the cup part 133; and the gas discharge part 136 which is attached from the inside to the hole 137 formed by perforating at least one of the cup part 133 or the sealing part 134 and through which a gas passes. The gas discharge part 136 includes: the gas discharge layer 1362 through which the gas passes; and the outer functional layer 1361 which is formed on an outer surface of the gas discharge layer 1362 and has hydrophobicity. Also, the inner functional layer 1363 may be further provided which is formed on an inner surface of the gas discharge layer 1362 and has hydrophobicity.

To manufacture the battery case 13, the cup part 133 is formed by drawing and stretching the pouch film 135 first. As illustrated in FIG. 5, the pouch film 135 include a gas barrier layer 1351, a surface protection layer 1352, and a sealant layer 1353.

The gas barrier layer 1351 ensures the mechanical strength of the battery case 13, blocks a gas or moisture entering from the outside of the secondary battery 1, and prevent an electrolyte from leaking. Generally, the gas barrier layer 1351 includes a metal, and it is desirable that an aluminum foil is mainly used. The aluminum may be lightweight while ensuring a predetermined level of more of the mechanical strength, and also may supplement electrochemical properties by the electrode assembly 10 and the electrolyte and ensure heat radiation or the like. However, the embodiment is not limited thereto, and the gas barrier layer 1351 may include various materials. For example, the materials may be one or more materials selected from the group consisting of iron (Fe), carbon (C), chrome (Cr), manganese (Mn), nickel (Ni) and aluminum (Al). Here, when the gas barrier layer 1351 is made of a material containing iron, the mechanical strength is improved, and when made of a material containing aluminum, the flexibility is enhanced. Thus, the material may be used, by taking into consideration each characteristic thereof.

The surface protection layer 1352 is made of a polymer, is positioned as an outermost layer, and electrically insulates the electrode assembly 10 from the outside while protecting the secondary battery 1 from friction and collision with the outside. Here, the outermost layer represents a layer which is positioned farthest away from the gas barrier layer 1351 in the direction toward the side opposite to the electrode assembly 10. The polymer used to manufacture the surface protection layer 1352 may be one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, it is desirable to mainly use polymers having the wear resistance and thermal resistance such as nylon resin or polyethylene terephthalate (PET). Also, the surface protection layer 1352 may have a single layer structure which is made of one material or a composite layer structure in which two or more materials respectively constitute layers.

The sealant layer 1353 is made of a polymer, is positioned as an innermost layer, and is in direct contact with the electrode assembly 10. Here, the innermost layer represents a layer which is positioned farthest away from the gas barrier layer 1351 in the direction toward the electrode assembly 10. Thus, the gas barrier layer 1351 is disposed between the surface protection layer 1352 and the sealant layer 1353 as illustrated in FIG. 5. The sealant layer 1353 has to have insulating characteristics because it is in direct contact with the electrode assembly 10, and also has to have corrosion resistance because it comes into contact with the electrolyte. Also, the sealant layer 1353 has to have high sealing characteristics because it has to completely seal the inside to block the movement of materials between the inside and the outside. The sealing parts 134 in which the sealant layers 1353 are bonded to each other have to have excellent thermal bonding strength. Generally, the polymer used to manufacture the sealant layer 1353 may be one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, it is desirable to mainly use polyolefin-based resin such as polypropylene (PP) or polyethylene (PE). Since the polypropylene (PP) has excellent mechanical properties such as tensile strength, rigidity, surface hardness, wear resistance, and thermal resistance, and excellent chemical properties such as corrosion resistance, it is mainly used to manufacture the sealant layer 1353. Furthermore, it may be constituted by casted polypropylene or polypropylene-butylene-ethylene terpolymer. Also, the sealant layer 1353 may have a single layer structure which is made of one material or a composite layer structure in which two or more materials respectively constitute layers.

Here, adhesive layers 1354 may be further provided between the gas barrier layer 1351, the surface protection layer 1352, and sealant layer 1353 to bond these layers.

When the pouch film 135 having the stack structure described above is drawn using a punch or the like, a portion thereof is stretched to form the cup part 133 that includes the accommodation space 1331 having a bag shape. Also, the hole 137 is made by perforating at least one of the cup part 133 or the sealing part 134.

When the hole 137 is made, the gas discharge part 136 manufactured to allow the gas to pass therethrough is attached from the inside to the hole 137 as illustrated in FIG. 5. Only one hole 137 may be formed, but the plurality of holes may be also possible. Accordingly, one gas discharge part 136 may be formed, but the plurality of gas discharge parts may be also possible.

Here, if the gas discharge part 136 is attached from the outside the metal of the gas barrier layer 1351 exposed to the inner circumferential surface 1371 of the hole 137 may be corroded by the electrolyte. Also, the gas discharge part 136 is attached to the hole 137 from the inside. Accordingly, the metal of the gas barrier layer 1351 exposed to the inner circumferential surface 1371 of the hole 137 may be prevented from being corroded by the electrolyte.

When the gas discharge part 136 is attached to the hole 137, the outer functional layer 1361 of the gas discharge part 136 is bonded to one surface of the sealant layer 1353. Particularly, it is desirable that the sealing is made by applying heat and pressure to prevent the bonding from easily tearing off due to the electrolyte. Thus, it is desirable that the sealant layer 1353 and the outer functional layer 1361 have the same or similar material so that the outer functional layer 1361 is easily sealed to the sealant layer 1353.

When the electrode assembly 10 is accommodated in the inside of the accommodation space 1331 provided in the cup part 133, the electrolyte is injected. Subsequently, the upper case 131 and the lower case 132 are brought into contact with each other, and the sealing part 134 is heat-pressed. Accordingly, the sealant layers 1353 are bonded to each other to seal the battery case 13. Consequently, the secondary battery 1 according to the embodiment of the present invention may be manufactured.

Those with ordinary skill in the technical field to which the present invention pertains will understand that the present invention may be carried out in other specific forms without changing the technical idea or essential features. Thus, the above-described embodiments are to be considered illustrative and not restrictive to all aspects. The scope of the present invention is defined by the appended claims rather than the foregoing description and the exemplary embodiments described therein. Various modifications made within the meaning and scope of claims and equivalent concepts of the claims are included in the scope of the present invention.

The invention claimed is:

1. A battery case for a secondary battery, the battery case comprising:
   a cup part provided with an accommodation space configured to accommodate an electrode assembly, the electrode assembly including an electrode, a separator and an electrolyte;
   a sealing part extending outward from the cup part; and
   a gas discharge part attached to a hole formed by perforating at least one of the cup part or the sealing part, the hole configured to allow a gas to pass therethrough,
   wherein the gas discharge part comprises:
   a gas discharge layer configured to allow the gas to pass therethrough, the gas discharge layer comprising a semipermeable membrane formed by a biaxial stretching or a phase separation of the semipermeable membrane such that the semipermeable membrane is configured to allow gas to pass therethrough but restrict liquid;
   an outer hydrophobic functional layer formed to cover an outer surface of the gas discharge layer adjacent the hole, and
   an inner functional layer formed on an inner surface of the gas discharge layer opposite the outer functional layer, the inner functional layer being hydrophobic to prevent the electrolyte from passing from passing therethrough.

2. The battery case of claim 1, wherein the outer functional layer comprises a plurality of protrusions distributed on an outer surface thereof.

3. The battery case of claim 2, wherein each of the protrusions has a diameter of 50 nm to 10 μm.

4. The battery case of claim 3, wherein each of the protrusions has a diameter of 100 nm to 1 μm.

5. The battery case of claim 1, wherein the outer functional layer comprises an oil or a wax component.

6. The battery case of claim 5, wherein the oil comprises at least one of fluorocarbon oil, silicone oil, carbon-based oil, or fatty acid amide.

7. The battery case of claim 1, wherein the gas discharge layer comprises at least one of polypropylene (PP), polyethylene (PE), polytetrafluoroethylene (PTFE), or polyvinylidene fluoride (PVDF).

8. The battery case of claim 1, wherein the sealing part comprises:
 an inner area adjacent to the cup part; and
 an outer area positioned away from the inner area to form an edge, the outer area configured to form a seal to seal the cup part,
 wherein the hole is formed in the inner area of the sealing part.

9. The battery case of claim 1, wherein the battery case includes a plurality of gas discharge parts.

10. A secondary battery comprising the battery case of claim 1 and an electrode assembly including an electrode and a separator, the electrode assembly being accommodated in the accommodation space of the battery case.

* * * * *